(12) United States Patent
Wang

(10) Patent No.: US 6,942,223 B2
(45) Date of Patent: Sep. 13, 2005

(54) DUAL LAYER ROLL BOOT

(75) Inventor: Shen-Ling Allen Wang, Northville, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 10/656,991

(22) Filed: Sep. 5, 2003

(65) Prior Publication Data
US 2005/0051973 A1 Mar. 10, 2005

(51) Int. Cl.⁷ .................................................. F16J 3/00
(52) U.S. Cl. ..................................... 277/634; 277/654
(58) Field of Search ................................. 277/634–636, 277/650, 654; 464/175

(56) References Cited

U.S. PATENT DOCUMENTS

| | | | | |
|---|---|---|---|---|
| 1,922,431 A | * | 8/1933 | Geyer | 464/175 |
| 3,213,764 A | * | 10/1965 | Nelson et al. | 277/636 |
| 3,381,987 A | * | 5/1968 | Husen | 403/51 |
| 4,570,943 A | * | 2/1986 | Houseman et al. | 277/606 |
| 4,573,693 A | * | 3/1986 | Nakata et al. | 277/636 |
| 4,967,609 A | * | 11/1990 | Takagi et al. | 74/18 |
| 5,145,191 A | * | 9/1992 | Stewart et al. | 277/636 |
| 5,236,204 A | * | 8/1993 | Hempel | 277/636 |
| 5,432,226 A | * | 7/1995 | Aonuma et al. | 524/506 |
| 5,599,029 A | * | 2/1997 | Umeno | 277/636 |
| 6,033,608 A | * | 3/2000 | Reynolds et al. | 264/54 |
| 6,083,109 A | * | 7/2000 | Gerulski | 464/175 |
| 6,085,797 A | * | 7/2000 | Grabaum et al. | 138/121 |
| 6,386,551 B1 | * | 5/2002 | Martin | 277/634 |
| 6,673,857 B1 | * | 1/2004 | Knoll et al. | 524/315 |
| 6,764,243 B1 | * | 7/2004 | Inuzuka et al. | 403/50 |

FOREIGN PATENT DOCUMENTS

| | | |
|---|---|---|
| EP | 0 061 320 A | 9/1982 |
| EP | 0 342 061 A | 12/1989 |
| JP | 61 256 024 A | 11/1986 |

* cited by examiner

*Primary Examiner*—Alison K. Pickard
(74) *Attorney, Agent, or Firm*—Jennifer M. Brumbaugh; Mick A. Nylander

(57) ABSTRACT

A molded boot having an inner layer and an outer layer made from different elastomeric material. Each layer is compatible with the fluid environment to which it is exposed. The dual layer boot provides longer service life with less degradation caused by chemical and environmental exposure.

16 Claims, 2 Drawing Sheets

DUAL LAYER ROLL BOOT

TECHNICAL FIELD

The invention relates to an elastomer seal and more particularly to a boot seal for sealing of a joint.

BACKGROUND OF THE INVENTION

Elastomer boots are primarily used for sealing two parts that can be articulated relative to one another and which, more particularly, rotate at the same time. These parts constitute a joint. A typical application refers to sealing joints of the constant velocity and universal types. For this purpose, a boot with a cylindrical portion, typically having a smaller diameter is slipped on to a shaft connected to a first joint component, and an annular portion with a greater diameter is connected either directly or via an intermediate element to a second joint component. Between the cylindrical portion mentioned first and the annular portion with the greater diameter, there extends a wall. The wall has the shape of half a torus for a roll boot and has a bellows shape for a convoluted boot. When the two joint components carry out an articulation movement relative to one another, the radius of curvature of the wall decreases on the inside of the angle and increases on the outside of the angle. When the joint rotates in the articulated condition, the change in curvature in the roll boot wall moves across the circumference, so that during a complete 360° rotation, each point of the boot wall passes through a curvature maximum and a curvature minimum causing flexing of the boot wall. Flexing also occurs for each rotation of the boot due to gravitational and centripetal forces.

The boot is subject to internal flexing work that can lead to an increase in the temperature of the boot. The increase in temperature causes the boot material to be subject to an increase in chemical and thermal attack and may accelerates the boot degradation. Also, the increase in temperature degrades the material of the boot wall at an accelerated rate due to the increased chemical reaction caused by the exposure of the boot seal with the external and internal fluid environments.

The material of the boot wall also degrades because of fluid contact at the external and internal wall surfaces. The external surface of the boot is in contact and exposed to atmospheric conditions subjecting the material to the effects of weathering, chemical and other forms of degradation. The internal surface of the boot is in contact and exposed to joint grease subjecting it to chemical and other form of degradation. Selecting a material that is suitable for both environments can minimize the degradation in the boot wall.

Also, the intense flexing of the boot subjects the material to stress. If the boot was in an unstressed situation, a film layer of protection could remain on the material, such as with rubber. Without the film layer, the material is more prone to attack by chemical reaction and elastomer bond rupture caused by environmental exposure to elements, such as to ozone and oxygen. One form of bond rupture leads to an effect known as scission. Scission is a form of degradation where the material bonds are broken along polymer chains and results in a tearing type effect rendering the boot as an ineffective seal. Other harmful effects may occur if the material is selected improperly for the particular environmental exposure leading to decrease in mechanical strength and sealing effectiveness.

Boot construction is typically from a single material. The material is selected to provide the best protection from external and internal environmental exposure while providing the best mechanical properties for the application. By selecting a material that is more suitable for either the external or the internal environment, it leaves the one surface of the material open to less than optimal protection from its environment. The other choice is to pick a material that is somewhat resistant to both external and internal environments. However, this is not ideal because it leaves both surfaces of the boot open to attack and degradation. It would be beneficial to have a way to protect the external and internal surface of a boot wall from degradation when both surfaces are continually or intermittently exposed to different fluids.

SUMMARY OF THE INVENTION

The present invention provides a boot seal having external walls manufactured from different elastomeric materials. The outer layer material is resistant to the external fluid, such as ozone, and the inner layer material is resistant to the internal fluid, such as grease. Elastomeric material as defined in this invention contemplates material that is an elastomer. The different elastomeric materials may be of different elastomer chemical groups, same elastomer chemical group, or any fiber reinforced elastomer group, or any combination thereof. The elastomer group can comprise thermoplastic elastomers, rubbers, and other rubber like equivalents.

One embodiment of the present invention is a boot seal with two layers, each of which is different. The boot seal has a first end, a second end, and a body extending between the first end and the second end. The body has an outer layer made from an environmentally resistant material and an inner layer made from a grease resistant material.

Another embodiment of the present invention provides a joint seal comprising an injection molded boot seal having an inner layer and an outer layer made from different elastomeric materials. Each layer is compatible with the fluid environment to which it is exposed. This will give the boot seal longer life with less degradation caused by chemical, environmental, and temperature exposure.

A method of producing a boot seal having dual layers by injection molding is also provided. In one example, the boot seal is dual-injection molded. Another embodiment for injection molding a boot seal according to the present invention provides injection molding the outer layer with an elastomer having environmental compatibility and corrosion resistance properties. Then, injection molding the inner layer onto the outer layer. The inner layer includes an elastomer material that is compatible with and corrosion resistant to grease. By dual-injection molding, the boot wall is formed having material compatibility with two environments. An incidental benefit of using injection molding is that dimensional stability and material bonding occur in an optimal way when the boot seal is produced in this manner.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION

In the Figures, the same reference numbers denote like elements. In the Figures, the dual layer boot seal represented is capable of sealing any joint type configuration wherein the joint components move relative one another. Typical joints include a constant velocity universal joint or other similar joint wherein the joint parts move relative to each other on a cyclic basis. While the boot seal of the present invention is described with reference to a method and apparatus for sealing a constant velocity universal joint, the present invention may be adapted and utilized for other flexible shaft seals. In the following description, various parameters and components are described for several constructed embodiments. These specific parameters and components are included as examples and are not meant to be limiting.

Figure 1A:
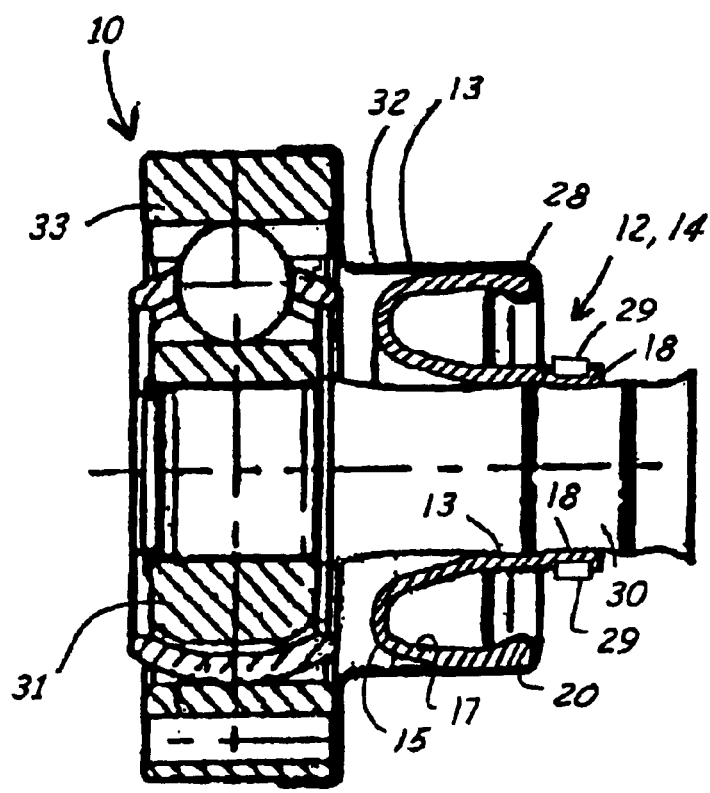
FIG. 1A shows a longitudinal sectional view of dual layer roll boot according to one embodiment of the present invention in an exemplary joint assembly.

FIG. 1A shows a longitudinal sectional view of dual layer roll boot according to one embodiment of the present invention in an exemplary joint assembly. The boot seal 12 comprises a boot seal wall 13. The boot seal 12 in this example is a roll boot 14 molded from an elastomer. The boot seal 12 is formed having an inner layer 15 and outer layer 17 in accordance with an embodiment of the present invention. The roll boot is shown sealing a joint 10. The roll boot 14 is fixed by a clamp 29 at a first end 18 to a shaft 30 of the joint 10, and is fixed by a crimped portion 28 at a second end 20 to a cover 32. The shaft 30 is connected to the inner joint part 31 of the joint 10. The cover 32 is connected to the outer joint part 33 of the joint 10. The inner joint part 31 is coupled to the outer joint part 33 by a plurality of torque transmitting balls held in a ball cage. Thus, the roll boot 14 has a boot seal wall 13 connecting the first end 18 to the second end 20 sealing the joint 10. The present embodiment of joint 10 as shown is a constant velocity joint. Of course, a roll boot according to the present invention could also be used to seal other constant velocity joint configurations and universal joint configurations.

Figure 1B:
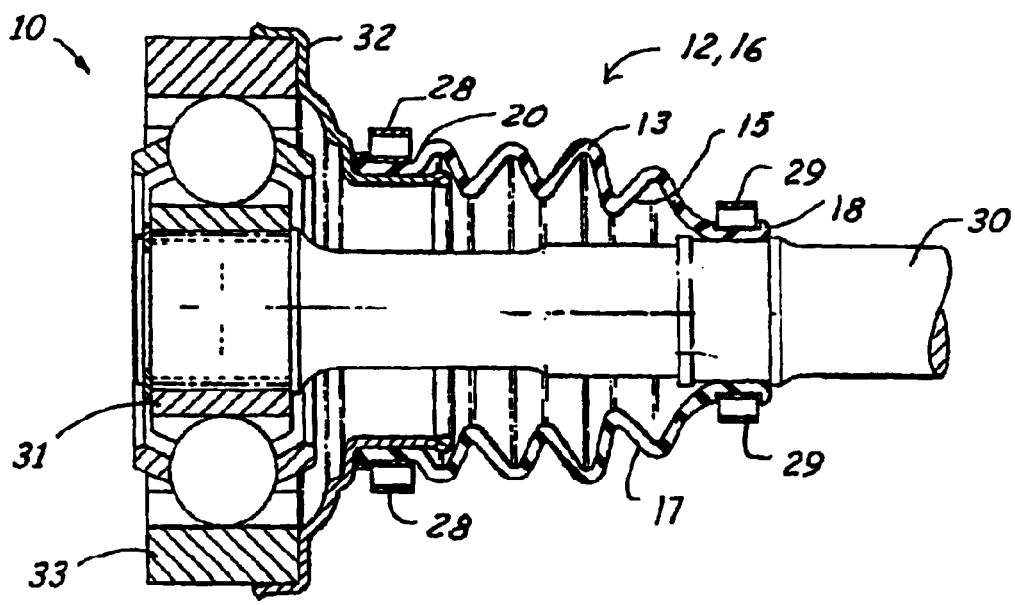
FIG. 1B shows a longitudinal sectional view of a dual layer convoluted boot according to another embodiment of the present invention in an exemplary joint assembly.

FIG. 1B shows a longitudinal sectional view of a dual layer convoluted boot another embodiment of the present invention in an exemplary joint assembly. The boot seal 12 comprises a boot seal wall 13. The boot seal 12 in this example is a convoluted boot 16 molded from an elastomer. The boot seal 12 is formed having an inner layer 15 and outer layer 17 in accordance with an embodiment of the present invention. The convoluted boot is shown sealing a joint 10. The convoluted boot 16 is fixed by a clamp 29 at a first end 18 to a shaft 30 of the joint 10, and is fixed by a clamp 28 at a second end 20 to a cover 32. The shaft 30 is connected to the inner joint 31 of the joint 10. The cover 32 is connected to the outer joint 33 of the joint 10. The inner joint 31 is coupled to the outer joint 33 by a plurality of torque transmitting balls held in a ball cage. Thus, the convoluted boot 16 has a boot seal wall 13 connecting the first end 18 to the second end 20 sealing the joint 10. The present embodiment of joint 10 as shown is a constant velocity joint. Of course, a boot seal according to the present invention could also be used to seal other constant velocity joint configurations and universal joint configurations.

The boot seal, whether a roll boot or a convoluted boot, is affixed to a joint by clamping, crimping or other sealing methods. The boot seal provides a seal over the joint that protects it from the environment by sealing out the external atmosphere and sealing in the joint grease. The boot seal wall, with its two fluid compatible layers 15, 17, has longer life because of the each material layer 15, 17 is resistant to degradation in the environment in which it operates. Thus, in most cases, the inner layer 15 is a grease resistant layer and the outer layer 17 is an ozone resistant layer. The material of each layer 15, 17 of the boot seal wall is selected to enhance protection from the most adverse environment, including grease and ozone exposures. Further, one or both of the material layers could be selected in accordance with the present invention for additional strength properties, temperature properties, and abrasion properties. Selection criteria of the material layers could also include other properties that would enhance the performance of the boot seal having two or more layers.

Figure 2:
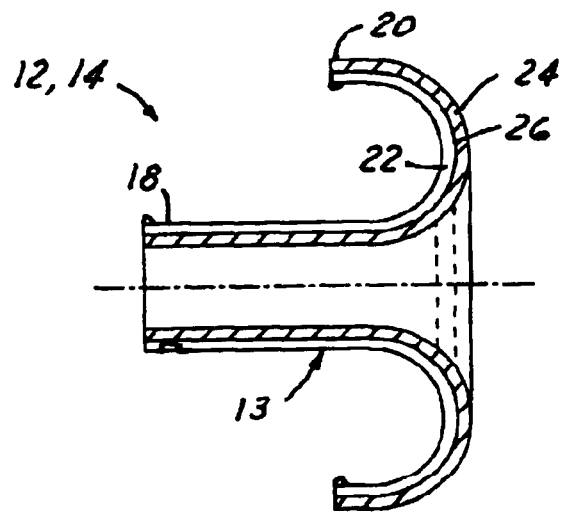
FIG. 2 shows a longitudinal sectional view of a dual layer roll boot similar to FIG. 1A.

FIG. 2 shows a more detailed longitudinal sectional view of a dual layer roll boot 14 similar to FIG. 1A. The roll boot 14 has a first end 18 and a second end 20 connected by a boot seal wall 13. The first end 18 can include an annular grove for receiving a clamp. The second end 20 can include an annular rib for securing with a crimp. The boot seal wall 13 is comprised of two or more layers made from an elastomeric material. In this example, the boot seal wall 13 comprises an outer layer 22 and an inner layer 24. The outer layer 22 and the inner layer 24 are adjoined at a bond region 26. The bond region 26 is representative of the interface or bonding surface between each material. The bonding region 26 may be a glue interface, a bonded interface, a cohesive interface, or another compliant material connecting the inner layer 24 and the outer layer 22 together. The bonding region 26 may also represent multiple layers within the layer to achieve additional property protection and endurance of the boot seal, e.g. achieving enhanced strength protection along with the grease and ozone resistant layers. A woven or stranded plastic or fabric material may comprise the bonding region 26.

Figure 3:
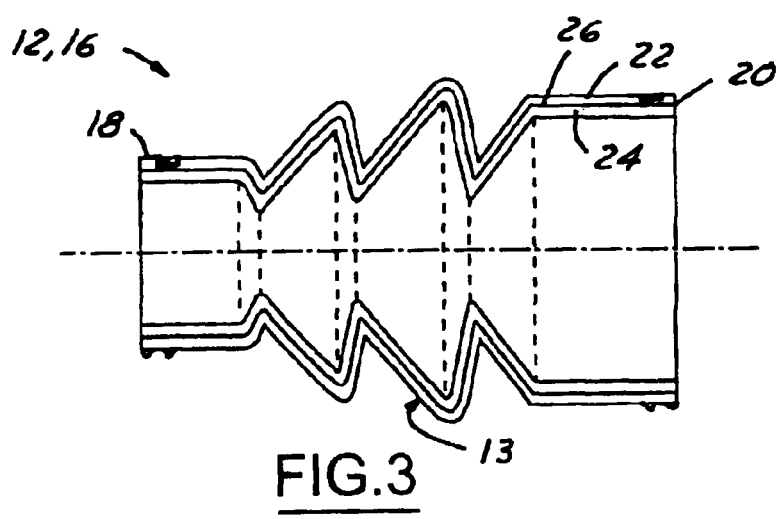
FIG. 3 shows a longitudinal sectional view of a dual layer convoluted boot similar to FIG. 1B.

FIG. 3 shows a more detailed longitudinal sectional view of a dual layer convoluted boot similar to FIG. 1B. The convoluted boot 16 has a first end 18 and a second end 20 connected by a boot seal wall 13. The first end 18 can include an annular grove or annular rib for securing with a clamp or crimp. The second end 20 can include an a annular grove or annular rib for securing with a clamp or crimp. The boot seal wall 13 is comprised of two or more layers made from an elastomeric material. The boot seal wall 13 comprises an outer layer 22 and an inner layer 24. The outer layer 22 and the inner layer 24 adjoined at a bond region 26. The bond region 26 is representative of the interface or bonding surface between each material. The bonding region 26 may be a glue interface, a bonded interface, a cohesive interface, or another compliance material connecting the inner layer 24 and the outer layer 22 together. The bonding region 26 may also represent multiple layers within the layer to achieve additional property protection and endurance of the boot seal, e.g. achieving enhanced strength protection along with the grease and ozone resistant layers. A woven or stranded plastic or fabric material may comprise the bonding region 26. In another embodiment, the bonding region 26 can comprise a compliance layer that is intermeshed between the outer layer 22 and the inner layer 24. The compliance layer can be of a woven or stranded plastic or other fabric material that is compatible with the material of the different layers 22, 24.

Molding of the boot seal, whether convoluted boot or roll boot, is by injection, blow molding or other methods known to those in the art. The embodiments presented in the following examples are dual-injection molded. The process involves injection molding a first material and then injection molding the second material. This can be done simultaneously or sequentially. The first material is the inner or the outer layer and the second material is the outer or the inner layer, respectfully. The material of the two layers bond and cure during the injection molding process. The material for inner layer may be selected from a group of grease compatible materials, such as hydrogenated nitrile rubber (HNBR). The material for the outer layer may be selected from a group of environmental or ozone resistant materials, such as ethylene propylene diene rubber (EPDM), chloroprene rubber (CR), or florosilicone rubber (FQM). The inner layer or the outer layer material can be selected from any combination of elastomeric materials. The two layers may even be selected from the same material group, with one layer having a reinforcement fiber, such as HNBR for the inner layer and reinforced fiber HNBR for the outer layer. Further, the boot seal wall performance may be enhanced with any combination of materials selected for the inner and outer layers of the boot seal. The materials for the inner layer and the outer layer should be selected to improve compatibility while enhancing resistance against various environments. Fore example, the selection criteria may include protecting against an internal environment having grease and an external environment having ozone. The particular selection criteria will, of course, vary depending upon the particular boot seal application under consideration. Other selection criteria may include wear resistance, chemical resistance, visible or invisible (UV, IR) light resistance, etc.

Figure 4A:
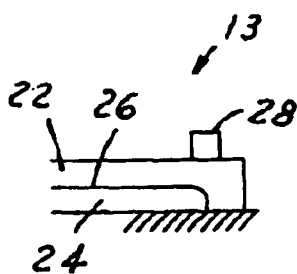
FIGS. 4A, 4B, and 4C show partial longitudinal sectional views of various embodiments of boot seal walls at a joint connection end according to the present invention.
Figure 4B:
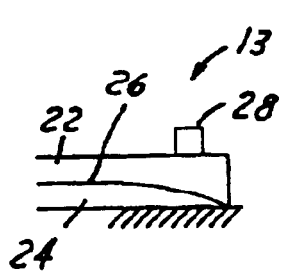
Figure 4C:
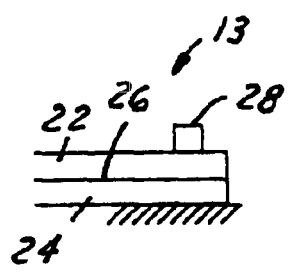

FIGS. 4A, 4B, and 4C show partial longitudinal sectional views of various embodiments of boot seal walls at a joint connection end according to the present invention. The boot seal wall 13, having an inner layer 24 and an outer layer 22, is connected to the shaft 30 or housing 32 of the joint 10 at the first end 18 or second end 20, respectfully, using a clamp 28 or crimped connection as shown in FIG. 1A. Each of the three sectional views represents the layering configuration of the inner layer 24 and outer layer 22.

FIG. 4A shows that the inner layer 24 is not exposed to the external environment and is completely covered by the outer layer 22. In other words, the outer layer 22 extends over the end region of the inner layer 24. Thus, the outer layer 22 may be subjected to the same environment as the inner layer 24 only locally in the region of the clamp 28.

FIG. 4B shows the material layers in such a way that the outer layer 22 is exposed only to the external environment and the inner layer 24 is exposed to the internal environment. In this case, the end region of the inner layer 24 tapers to terminate substantially at the end of the outer layer 22. FIG. 4C shows the material layers such that the edge region of the inner layer 24 is exposed to external environment, but the outer layer 22 is not exposed to the internal environment.

Molding of the inner layer 24 and the outer layer 22 may be uniform in thickness or may be non-uniform in thickness. Each layer may also be a different thickness. The embodiment of the present invention, the boot seal is of uniform thickness and the two layers 22, 24 being bonded at the bonded region 26 will be clamped 28 or crimped about the bonded region 26 where each layer 22, 24 is minimally exposed to the internal and external fluid conditions, as shown in FIG. 4A.

While the invention has been described in connection with several embodiments, it should be understood that the invention is not limited to those embodiments. For example, three or more layers may be necessary to meet strength or wear requirements for the particular application under consideration. Thus, the invention covers all alternatives, modifications, and equivalents as may be included in the spirit and scope of the appended claims.

What is claimed is:

1. A boot seal comprising:
   a first end;
   a second end;
   a boot seal wall extending between the first end and the second end, the boot seal wall comprising an inner layer resistant to grease and an outer layer resistant to ozone wherein each layer comprises a different material; and
   wherein said inner layer of said boot seal wall includes an end region disposed at both the first and second ends, and said outer layer is circumjacent to said inner layer such that said end region is unexposed to ozone of an external environment.

2. The boot seal of claim 1 wherein the inner layer comprises hydrogenated nitrile and the outer layer comprises ethylene propylene diene rubber.

3. The boot seal of claim 1 wherein the outer layer and the inner layer are made from elastomers.

4. The boot seal of claim 3 wherein the elastomers comprise rubbers and thermoplastic elastomers.

5. The boot seal of claim 1 wherein the outer layer and the inner layer are bonded together.

6. The boot seal of claim 1 wherein the outer layer and the inner layer are glued together.

7. The boot seal of claim 1 further comprising a compliance layer intermeshed with the bonding region between said inner layer and said outer layer.

8. The boot seal of claim 1 wherein said inner layer and said outer layer each have a generally uniform thickness.

9. The boot seal of claim 1 wherein at least one of said inner layer and said outer layer have a variable thickness along a length of the boot seal.

10. A boot seal for sealing a joint comprising:
    a first end adapted to connect to a first joint part;
    a second end adapted to connect to a second joint part;
    a boot seal wall extending between the first end and the second end, the boot seal wall comprising an inner layer resistant to grease and an outer layer resistant to ozone wherein each layer comprises a different material; and
    wherein said inner layer of said boot seal wall includes an end region disposed at both the first and second ends and said outer layer is circumjacent to said inner layer such that said end region is unexposed to ozone of an external environment.

11. The boot seal of claim 10 wherein the inner layer comprises hydrogenated nitrile and the outer layer comprises ethylene propylene diene rubber.

12. The boot seal of claim 10 wherein the outer layer and the inner layer are made from elastomers.

13. The boot seal of claim 12 wherein the elastomers comprises rubbers and thermoplastic elastomers.

14. The boot seal of claim 10 wherein the outer layer and the inner layer are bonded together.

15. The boot seal of claim 10 wherein the outer layer and the inner layer are glued together.

16. The boot seal of claim 10 further comprising a compliance layer intermeshed with the bonding region between said inner layer and said outer layer.

* * * * *